United States Patent
Mente

(10) Patent No.: US 7,416,785 B2
(45) Date of Patent: Aug. 26, 2008

(54) POLYURETHANE-ENCAPSULATED PARTICLE COMPRISING POLYOL DERIVED FROM AROMATIC AMINE-BASED INITIATOR

(75) Inventor: Donald C. Mente, Grosse Ile, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/853,826

(22) Filed: May 26, 2004

(65) Prior Publication Data

US 2005/0266245 A1 Dec. 1, 2005

(51) Int. Cl.
*B32B 5/16* (2006.01)
*C05F 11/00* (2006.01)

(52) U.S. Cl. .............. 428/407; 71/64.07; 71/64.11; 524/722

(58) Field of Classification Search .......... 428/407; 71/64.07, 64.11; 524/722
See application file for complete search history.

(56) References Cited

U.S. PATENT DOCUMENTS

| | | | |
|---|---|---|---|
| 3,259,482 A | 7/1966 | Hansen | |
| 3,264,089 A | 8/1966 | Hansen | |
| 3,475,154 A | 10/1969 | Kato | |
| 3,671,470 A * | 6/1972 | Case .................. | 521/166 |
| 3,875,074 A | 4/1975 | Vassiliades et al. | |
| 4,370,463 A * | 1/1983 | Schafer ................ | 528/78 |
| 4,469,502 A | 9/1984 | Heller et al. | |
| 4,681,806 A | 7/1987 | Matkan et al. | |
| 4,711,659 A | 12/1987 | Moore | |
| 4,738,989 A * | 4/1988 | Smith .................. | 521/107 |
| 4,772,490 A | 9/1988 | Kogler et al. | |
| 4,804,403 A | 2/1989 | Moore | |
| 4,969,947 A | 11/1990 | Moore | |
| 5,374,292 A | 12/1994 | Detrick et al. | |
| 5,525,641 A * | 6/1996 | White et al. ........... | 521/131 |
| 5,538,531 A | 7/1996 | Hudson et al. | |
| 5,547,486 A | 8/1996 | Detrick et al. | |
| 5,652,196 A * | 7/1997 | Luthra et al. ........... | 504/359 |
| 5,803,946 A | 9/1998 | Petcavich et al. | |
| 5,851,261 A | 12/1998 | Markusch et al. | |
| 6,100,308 A * | 8/2000 | Guettes et al. ......... | 521/131 |
| 6,176,891 B1 | 1/2001 | Komoriya et al. | |
| 6,231,633 B1 | 5/2001 | Hirano et al. | |
| 6,316,513 B1 * | 11/2001 | McCullough et al. .... | 521/174 |
| 6,358,296 B1 | 3/2002 | Markusch et al. | |
| 6,364,925 B1 * | 4/2002 | Markusch et al. ....... | 71/64.07 |
| 6,410,801 B1 * | 6/2002 | Hinz et al. ............. | 568/606 |
| 6,663,686 B1 | 12/2003 | Geiger et al. | |
| 6,914,117 B2 * | 7/2005 | Bleys et al. ............ | 528/49 |
| 2003/0033843 A1 | 2/2003 | Tabel | |
| 2004/0016276 A1 | 1/2004 | Wynnyk et al. | |
| 2004/0020254 A1 | 2/2004 | Wynnyk et al. | |
| 2004/0045331 A1 | 3/2004 | Geiger et al. | |

FOREIGN PATENT DOCUMENTS

| | | |
|---|---|---|
| CA | 2149075 | 11/1996 |
| CA | 2272480 | 11/1999 |
| EP | 0 867 422 A2 | 9/1998 |
| WO | WO 98/29360 | 7/1998 |
| WO | WO 02/00573 A2 | 1/2002 |
| WO | WO2005/118509 | * 12/2005 |

\* cited by examiner

*Primary Examiner*—H. T Le
(74) *Attorney, Agent, or Firm*—Fernando A. Borrego

(57) ABSTRACT

An encapsulated particle includes a core particle. The core particle includes a fertilizer selected from the group of nitrogen, phosphate, potash, and sulfur, and combinations thereof. The core particle may also include herbicides, insecticides, and fungicides. The encapsulated particle also includes a polyurethane layer disposed about the core particle. The polyurethane layer includes the reaction product of an aromatic isocyanate component and a polyol that is reactive with the aromatic isocyanate component. The aromatic isocyanate component includes methylene diphenyl diisocyanate, toluene diisocyanate, and mixtures thereof. The polyol that is reactive with the aromatic isocyanate component is derived from an aromatic amine-based initiator and includes a toluene diamine. The aromaticity of the aromatic isocyanate component and the polyol serves to insure complete miscibility between the aromatic isocyanate and the polyol thereby forming the polyurethane layer without defects preventing water from permeating the polyurethane layer and dissolving the core particle.

27 Claims, No Drawings

POLYURETHANE-ENCAPSULATED PARTICLE COMPRISING POLYOL DERIVED FROM AROMATIC AMINE-BASED INITIATOR

BACKGROUND OF THE INVENTION

1. Field of the Invention

The subject invention generally relates to an encapsulated particle. More specifically, the subject invention relates to an encapsulated particle that includes a polyurethane layer disposed about a core particle and that is used as a controlled-release fertilizer.

2. Description of the Related Art

Encapsulated particles that are used as controlled-release fertilizers are known in the art. Specifically, the encapsulated particles include layers disposed about core particles. More specifically, the layers that are disposed about the core particles include polyurethane layers. A thickness and external integrity of the polyurethane layers limit a rate that the core particles dissolve in a soil that includes water and moisture.

More specifically, prior art encapsulated particles include a core particle selected from a group of fertilizer particles. The disadvantages of using the prior art encapsulated particles include inconsistent external integrity and thickness of the polyurethane layers resulting in a very fast rate that the core particles dissolve in the soil. As is known in the art, the very fast rate that the core particles dissolve in the soil leads to phytotoxicity. Additional disadvantages of using the prior art encapsulated particles include an inability to effectively customize the thickness of the polyurethane layer disposed about the core particle and the requirement of expensive and perishable manufacturing components, such as castor oil. Castor oil is utilized for the production of the polyurethane layers serving as a polyol that is reactive with an isocyanate to form the polyurethane layers.

Specifically, castor oil is subject to unpredictable market price fluctuations and unpredictable quality control. Further, castor oil is perishable and thus is not suitable for long term storage and use in mass production of encapsulated particles. Still further, castor oil contains double bonds in its lipid structure and is prone to lipid oxidation. Lipid oxidation occurs when the double bonds in the castor oil react with oxygen to form peroxides and change the chemical nature of the castor oil. Finally, castor oil is not aromatic. When serving as a polyol that is reactive with an aromatic isocyanate to form the polyurethane layers, castor oil is not completely miscible with the aromatic isocyanate due to a lack of aromaticity, and thus, is not suitable for use.

Most importantly, the primary disadvantage of the prior art encapsulated particles includes a tendency to exhibit polyurethane layers that include defects. Defects in the polyurethane layers result from an incomplete miscibility between an isocyanate and a polyol that is reactive with the isocyanate to form the polyurethane layers. For example, when an organic, non-aromatic polyol is combined with an aromatic isocyanate, miscibility may not be complete. Rather, the organic, non-aromatic polyol could react with the aromatic isocyanate only at their interface.

Incomplete miscibility between the aromatic isocyanate and the non-aromatic polyol subsequently leads to polyurethane layers that include defects such as pits and depressions. When the polyurethane layer that includes defects is disposed about the core particle, the pits and depressions allow water and other liquids to permeate the polyurethane layer and rapidly dissolve the core particle. To cure the defects, multiple polyurethane layers must be disposed about the core particle resulting in a time consuming and expensive process.

Many different layers can be disposed about core particles. U.S. Pat. No. 5,538,531 to Hudson discloses a plurality of water insoluble, abrasion resistant layers disposed about a core particle that includes a controlled-release fertilizer. A first layer is disposed about the core particle and includes a polyurethane derived from the reaction product of an aromatic isocyanate and a non-aromatic polyol that is reactive with the aromatic isocyanate. A second layer, formed from an organic wax, is disposed about the first layer to cover any defects in the first layer and prevent water and other liquids from permeating the first layer and rapidly dissolving the core particle. The '531 patent does not disclose the use of a polyol derived from an aromatic amine-based initiator.

Similarly, U.S. Pat. No. 6,663,686 to Geiger and U.S. Pub. Nos. 2004/0020254 and 2004/0016276 to Wynnyk, all assigned to Agrium® Inc. of Calgary, Alberta, also disclose a polyurethane layer disposed about a core particle. The '686 patent and the '254 and '276 publications disclose the use of aromatic isocyanates including diphenylmethane diisocyanate, toluene diisocyanate, and mixtures thereof. Additionally, the '686 patent and the '254 and '276 publications disclose the use of non-aromatic polyols including castor oil and hydrogenated castor oil. Yet, neither the '686 patent nor the '254 and '276 publications disclose the use of a polyol derived from an aromatic amine-based initiator.

Yet, the controlled-release fertilizers disclosed in the '686 patent and the '254 and '276 publications are not the sole prior art. U.S. Pat. No. 3,475,154 to Kato discloses a polymer layer disposed about a coated pellet. The polymer layer includes the reaction product of active hydrogen, in the form of polyols and polyamines, and an aromatic isocyanate. The '154 patent does not disclose the use of a polyol derived from an aromatic amine-based initiator.

Finally, U.S. Pat. No. 3,264,089 to Hansen and U.S. Pat. No. 4,711,659 to Moore disclose a plurality of polyurethane layers disposed about a core particle. The polyurethane layers include the reaction product of an aromatic isocyanate and a polyol. In both the '089 and '659 patents, the aromatic isocyanate includes methylene diphenyl diisocyanate, toluene diisocyanate, and mixtures thereof. Additionally, in both the '089 and '659 patents, the polyol includes polyether diols and polyols. Further, in the '659 patent, the polyol involves reactions with amine-terminating groups. Yet, neither the '089 patent nor the '659 patent disclose the use of a polyol derived from an aromatic amine-based initiator. Specifically, in the '659 patent, the polyol reacting with the amine-terminating groups is not equivalent to a polyol derived from an aromatic amine-based initiator. Namely, in the '659 patent, the polyol that includes amine terminating groups is not aromatic and therefore is not completely miscible with aromatic isocyanates. Conversely, the polyol derived from an aromatic amine-based initiator is terminated in an alkyl group and not an amine group. Additionally, the polyol derived from an aromatic amine-based initiator includes amine functionality at the beginning of the alkyl chain. Therefore, the polyol derived from an aromatic amine-based initiator is fully miscible with aromatic isocyanates and is unlike any polyol disclosed in either the '089 patent or the '659 patent.

SUMMARY OF THE INVENTION AND ADVANTAGES

The subject invention provides an encapsulated particle. The encapsulated particle includes a core particle and a polyurethane layer. The polyurethane layer is disposed about the core particle and includes the reaction product of an isocyanate component and a polyol. The polyol is derived from an aromatic amine-based initiator. The aromatic amine-based initiator is of the formula:

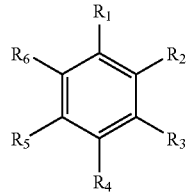

wherein $R_1$ includes one of an alkyl group, an amine group, and a hydrogen and each of $R_2$-$R_6$ independently include one of an amine group and a hydrogen, so long as at least one of $R_1$-$R_6$ is an amine group.

The aromatic amine-based initiator provides a polyol that is completely miscible with the isocyanate component. The complete miscibility of the isocyanate component and the polyol that is derived from an aromatic amine-based initiator is the result of two primary effects. First, the complete miscibility is due to London Forces that create momentarily induced dipoles between similar aromatic moieties of the polyol and the isocyanate component. The momentarily induced dipoles allow the isocyanate component and the polyol to mix effectively. Secondly, the complete miscibility is due to the planar geometry of the aromatic moieties of the polyol and the isocyanate component that allow for complementary stacking of the polyol and isocyanate component. The complementary stacking of the aromatic moieties also allows the isocyanate component and the polyol to mix effectively.

The complete miscibility of the isocyanate component and the polyol derived from the aromatic amine-based initiator yields multiple advantages. The complete miscibility results in an ability to use various techniques for applying the polyol and the isocyanate component onto the core particle. The techniques include, but are not limited to, pan coating, fluidized-bed coating, co-extrusion, spraying and spinning disk encapsulation. In commercial application, practitioners of each of these techniques will experience the advantages described by this invention.

Specifically, spraying the polyol and the isocyanate component onto the core particle results in a uniform, complete, and defect-free polyurethane layer disposed about the core particle. Spraying also results in a thinner and less expensive polyurethane layer disposed about the core particle. Furthermore, the polyol is shelf-stable thereby allowing for more effective storage and subsequent usage.

The uniform, complete, and defect-free polyurethane layer disposed about the core particle allows for slow, controlled dissolution of the core particle in the soil and alleviates a need for a second layer to be disposed about the polyurethane layer to cover any defects in the polyurethane layer. Because there are no defects in the polyurethane layer disposed about the core particle, water and other liquids cannot permeate the polyurethane layer and rapidly dissolve the core particle, thus preventing phytotoxicity.

DETAILED DESCRIPTION OF A PREFERRED EMBODIMENT

An encapsulated particle, according to the present invention, includes a core particle. The core particle preferably includes a fertilizer selected from the group of nitrogen, phosphate, potash, sulfur, and combinations thereof. Most preferably, the fertilizer is nitrogen based and commercially available from Agrium® Inc. of Calgary, Alberta under the trade name of ESN® Controlled Release Nitrogen. Specifically, a fertilizer that is nitrogen based includes, but is not limited to, anhydrous ammonia, urea, ammonium nitrate, urea ammonium nitrate, calcium ammonium nitrate, and combinations thereof. A fertilizer that is phosphate based includes, but is not limited to, phosphoric acid, mono-ammonium phosphate, ammonium polyphosphate, ammonium phosphate sulfate, and combinations thereof. A fertilizer that is potash based includes, but is not limited to, potash, ammonium nitrate, and combinations thereof. A fertilizer that is sulfur based includes, but is not limited to, ammonium sulfate and sulfuric acid, and combinations thereof.

It is to be understood that alternative forms of core particles can also be used, i.e., core particles that are not fertilizers. Examples of such alternative forms of core particles include, but are not limited to, herbicides, insecticides, and fungicides.

The encapsulated particle additionally includes a polyurethane layer. The polyurethane layer is disposed about the core particle. It is to be understood that the terminology "disposed about" encompasses both partial and complete covering of the core particle by the polyurethane layer. The polyurethane layer includes the reaction product of an isocyanate component and a polyol that is reactive with the isocyanate component. The isocyanate component includes an aromatic isocyanate component. Preferably, the aromatic isocyanate component includes, but is not limited to, monomeric and polymeric methylene diphenyl diisocyanate, monomeric and polymeric toluene diisocyanate, and mixtures thereof. Most preferably, the isocyanate component is commercially available from BASF Corporation of Wyandotte, Mich. under the trade name of Lupranate® M20S.

Polymeric methylene diphenyl diisocyanates such as Lupranate® M20S offer high crosslink density and moderate viscosity. Alternatively, monomeric methylene diphenyl diisocyanates such as Lupranate® M Isocyanate offer low viscosity and high NCO content with low nominal functionality. Similarly, toluene diisocyanates such as Lupranate® TDI also offer low viscosity and high NCO content with low nominal functionality. Those skilled in the art will choose a suitable isocyanate component based on economics and suitability.

Preferably, the aromatic isocyanate component has a viscosity from 1 to 3000, more preferably from 20 to 700, and most preferably from 50-300 centipoise at 25° C. Preferably, the aromatic isocyanate component has a nominal functionality from 1 to 5, more preferably from 1.5 to 4, and most preferably from 2.0 to 2.7. Preferably, the aromatic isocyanate component has an NCO content from 20% to 50%, more preferably from 25% to 40% and most preferably from 30% to 33%.

The aforementioned viscosity, nominal functionality, and NCO content of the aromatic isocyanate component are preferred because of specific properties that each gives to the aromatic isocyanate. Specifically, the most preferred viscosity of the aromatic isocyanate component is from 50 to 300 centipoise at 25° C. to allow the aromatic isocyanate to be sprayed onto the core particle. The most preferred nominal functionality of the aromatic isocyanate component is from 2.0 to 2.7 to allow for effective reaction of the aromatic isocyanate with the polyol and for cost effectiveness. Finally, the most preferred NCO content of the aromatic isocyanate component is from 30% to 33%. The NCO content provides a high molecular crosslink density of the aromatic isocyanate that aids in the formation of a defect free polyurethane layer. The NCO content also provides an aromatic isocyanate with more chemical bonds per unit of mass to improve cost efficiency.

In addition to the aromatic isocyanate component, the polyurethane layer is also the reaction product of a polyol that is derived from an aromatic amine-based initiator. The polyol includes alkylene oxide substituents. Examples of suitable alkylene oxides substituents include ethylene oxide, propylene oxide, butylene oxide, amylene oxide, mixtures thereof, alkylene oxide-tetrahydrofuran mixtures, epihalohydrins, and aralkylene styrene. Most preferably, the polyol is commercially available from BASF Corporation of Wyandotte, Mich. under the trade name of Pluracol® Polyol 824.

Preferably, the polyol has a viscosity from 4,000 to 20,000, more preferably from 5,000 to 17,000, and most preferably from 10,000 to 15,000 centipoise at 25° C. To maximize efficiency, the polyol can be stored at and heated in the temperature range of from 60 to 80° C. Preferably, the polyol also has a nominal functionality from 1 to 7, more preferably from 2 to 6, and most preferably from 3 to 4. Preferably, the polyol has an OH number from 300 to 600, more preferably from 350 to 500, and most preferably from 380 to 450. Additionally, the polyol may also be derived from a dipropylene glycol initiator. In other words, the polyol may be co-initiated with dipropylene glycol.

The aforementioned viscosity, nominal functionality, and OH number of the polyol are preferred because of specific properties that each gives to the polyol. Specifically, the most preferred viscosity of the polyol is from 10,000 to 15,000 centipoise at 25° C. to allow the polyol to be sprayed onto the core particle. The most preferred nominal functionality of the polyol is from 3 to 4 to allow for effective reaction of the polyol with the aromatic isocyanate and to reduce the cost of the polyol. Finally, the most preferred OH number of the polyol is from 380 to 450 to maximize crosslinking density of the polyurethane layer.

As described above, the polyol is derived from the aromatic amine-based initiator. The aromatic amine-based initiator is of the formula:

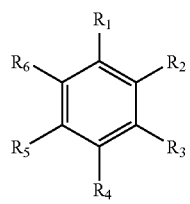

wherein $R_1$ includes one of an alkyl group, an amine group, and a hydrogen and each of $R_2$-$R_6$ independently include one of an amine group and a hydrogen, so long as at least one of $R_1$-$R_6$ is an amine group. Therefore, it is to be understood that $R_1$ can be any one of an alkyl group, an amine group, or a hydrogen, or any compound including combinations thereof. It is also to be understood that $R_2$-$R_6$ do not have to be identical and each can include an amine group or a hydrogen. It is also to be understood that the terminology "an amine group" refers to R—N—H and $NH_2$ throughout.

The aromatic amine-based initiator includes, but is not limited to a toluene diamine. The toluene diamine preferably includes, but is not limited to, the following structures:

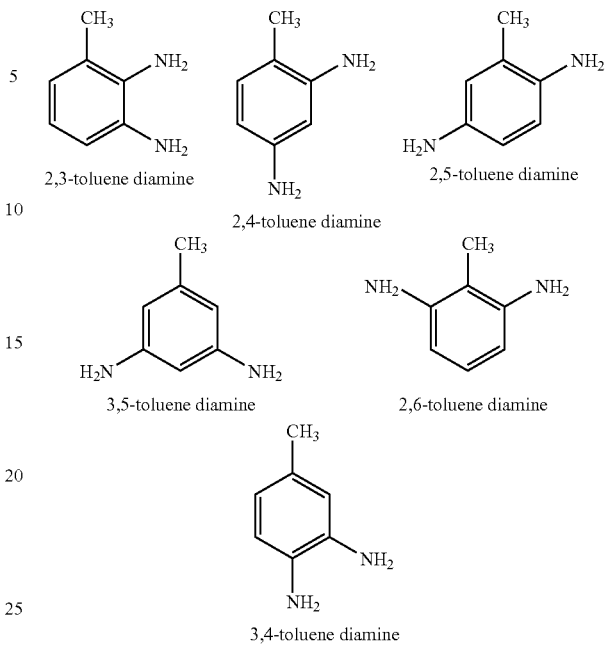

wherein the toluene diamine includes, but is not limited to, 2,3-toluenediamine, 2,4-toluenediamine, 2,5-toluenediamine, 2,6-toluenediamine, 3,4-toluenediamine, 3,5-toluenediamine, and mixtures thereof.

The reaction product of the isocyanate component and the polyol derived from the aromatic amine-based initiator may include a pigment for coloring the reaction product. The pigment allows the completeness of the polyurethane layer to be visually evaluated and can provide various marketing advantages.

The aromatic amine-based initiator provides a polyol that is completely miscible with the isocyanate component. The complete miscibility of the isocyanate component and the polyol that is derived from an aromatic amine-based initiator is the result of two primary effects. First, the complete miscibility is due to London Forces that create momentarily induced dipoles between similar aromatic moieties of the polyol and the isocyanate component. The momentarily induced dipoles allow the isocyanate component and the polyol to mix effectively. Secondly, the complete miscibility is due to the planar geometry of the aromatic moieties of the polyol and the isocyanate component that allow for complementary stacking of the polyol and isocyanate component. The complementary stacking of the aromatic moieties also allows the isocyanate component and the polyol to mix effectively.

The complete miscibility of the isocyanate component and the polyol derived from the aromatic amine-based initiator yields multiple advantages. The complete miscibility results in an ability to use various techniques for applying the polyol and the isocyanate component onto the core particle. The techniques include, but are not limited to, pan coating, fluidized-bed coating, co-extrusion, spraying and spinning disk encapsulation. In commercial application, practitioners of each of these techniques will experience the advantages described by this invention.

Specifically, spraying the polyol and the isocyanate component onto the core particle results in a uniform, complete, and defect-free polyurethane layer disposed about the core particle. Spraying also results in a thinner and less expensive polyurethane layer disposed about the core particle. Furthermore, the polyol is shelf-stable thereby allowing for more effective storage and subsequent usage.

The following examples illustrate the nature of the invention and are not to be construed as limiting of the invention. Unless otherwise indicated, all parts are given as parts by weight.

EXAMPLES

Encapsulated particles, according to the present invention, were prepared in beakers. Specifically, 4 g of a polyol derived from an aromatic amine-based initiator were heated to 90° C. and added dropwise to a beaker containing 100 g of commercial urea spheres to form a polyol-urea mixture. The polyol-urea mixture was swirled gently using a foam mix blade to ensure distribution of the polyol derived from an aromatic amine-based initiator around the urea spheres. 5 g of an aromatic isocyanate preheated to 90° C. was added to the polyol-urea mixture and manually swirled to ensure complete contact between the commercial urea spheres and the reaction product of the polyol derived from an aromatic amine-based initiator and the aromatic isocyanate. The complete contact resulted in a polyurethane layer disposed about the commercial urea spheres. The commercial urea spheres were subsequently stirred with a foam mix blade to minimize agglomeration resulting in a free flowing group of commercial urea spheres.

Three examples of the polyurethane layers disposed about commercial urea spheres used to represent possible controlled-release fertilizers are presented in Table 1 below. Example 1 represents the subject invention including an aromatic isocyanate and a polyol that is derived from an aromatic amine-based initiator. Specifically, Comparative Examples One and Two illustrate attempts to create polyurethane layers disposed about core particles disclosed in the prior art. Comparative Example One utilizes an aromatic isocyanate and a non-aromatic polyol that includes castor oil. Similarly, Comparative Example Two utilizes an aromatic isocyanate and a non-aromatic polyol that includes glycerine.

TABLE 1

| Component | Example 1 | Comparative Example 1 | Comparative Example 2 |
|---|---|---|---|
| Isocyanate | 3.0 | 3.0 | 3.0 |
| Polyol A | 3.0 | N/A | N/A |
| Polyol B | N/A | 3.0 | N/A |
| Polyol C | N/A | N/A | 3.0 |

The results of miscibility measurements, dissolution time measurements, and cure time measurements of the three aforementioned examples of the polyurethane layers are presented in Table 2 below. Example 1 represents the subject invention including an aromatic isocyanate and a polyol that is derived from an aromatic amine-based initiator. Specifically, Comparative Examples One and Two illustrate attempts to create polyurethane layers disposed about core particles disclosed in the prior art. Comparative Example One utilizes an aromatic isocyanate and castor oil, which is not aromatic and is not miscible with the aromatic isocyanate. Therefore, the polyurethane layer that is disposed about the core particle includes defects and allows water and other liquids to permeate the polyurethane layer and rapidly dissolve the core particle. Additionally, the immiscibility of the castor oil and the aromatic isocyanate greatly increases cure time of the polyurethane layer. Similarly, Comparative Example Two also utilizes an aromatic isocyanate and a non-aromatic polyol that is not completely miscible with the aromatic isocyanate and also results in a polyurethane layer that includes defects. Additionally, the partial miscibility of the aromatic isocyanate and the non-aromatic polyol increases the cure time of the polyurethane layer. Finally, the urea illustrates the dissolution time of a core particle that does not include a polyurethane layer.

TABLE 2

| | Example 1 | Comparative Example 1 | Comparative Example 2 | Urea |
|---|---|---|---|---|
| Miscibility of Isocyanate and Polyol | Complete | Partial | None | N/A |
| Dissolution Time of Core Particle | >1 day | >1 day | >1 day | <3 minutes |
| Cure Time of Polyurethane Layer | 5 minutes | 1 hour | 4 hours | N/A |

Polyol A is a polyol derived from an aromatic amine-based initiator including propylene oxide and ethylene oxide and has a hydroxyl number of 390, a nominal functionality of 4, and a viscosity of 10,500 centipoise at 25° C. Polyol A is commercially available from BASF Corporation of Wyandotte, Mich., under the trade name Pluracol® Polyol 824.

Polyol B is castor oil and has a hydroxyl number of 162 and a nominal functionality of 3.

Polyol C is a glycerine-initiated, propoxylated polyol and has a hydroxyl number of 399, a nominal functionality of 3, and a viscosity of 360 centipoise at 25° C. Polyol C is commercially available from BASF Corporation of Wyandotte, Mich., under the trade name Pluracol® Polyol GP430.

Isocyanate is a polymeric methylene diphenyl diisocyanate with a functionality of approximately 2.7, an NCO content of 31.5, and a viscosity of 200 centipoise at 25° C. Isocyanate is commercially available from BASF Corporation of Wyandotte, Mich. under the trade name of Lupranate® M20S.

What is claimed is:

1. An encapsulated particle comprising:
   A a core particle;
   B a polyurethane layer disposed about said core particle and comprising the reaction product of;
      (i) an isocyanate component, and
      (ii) a polyol derived from an aromatic amine-based initiator.

2. An encapsulated particle as set forth in claim 1 wherein said aromatic amine-based initiator comprises the formula:

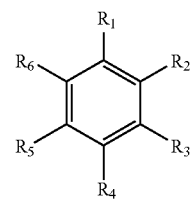

wherein $R_1$ comprises one of an alkyl group, an amine group, and a hydrogen; and wherein each of $R_2$-$R_6$ independently comprise one of an amine group and a hydrogen; so long as at least one of $R_1$-$R_6$ is an amine group.

3. An encapsulated particle as set forth in claim 1 wherein said aromatic amine-based initiator comprises a toluene diamine.

4. An encapsulated particle as set forth in claim 3 wherein said isocyanate component comprises an aromatic isocyanate component.

5. An encapsulated particle as set forth in claim 1 wherein said isocyanate component comprises an aromatic isocyanate component.

6. An encapsulated particle as set forth in claim 5 wherein said isocyanate component comprises methylene diphenyl diisocyanate.

7. An encapsulated particle as set forth in claim 5 wherein said isocyanate component comprises toluene diisocyanate.

8. An encapsulated particle as set forth in claim 1 wherein said isocyanate component has a viscosity of from 20 to 700 centipoise at 25° C.

9. An encapsulated particle as set forth in claim 1 wherein said isocyanate component has a nominal functionality of from 1.5 to 4.

10. An encapsulated particle as set forth in claim 1 wherein said isocyanate component has a NCO content of from 25-40%.

11. An encapsulated particle as set forth in claim 1 wherein said polyol has a viscosity of from 5,000 to 17,000 centipoise at 25° C.

12. An encapsulated particle as set forth in claim 1 wherein said polyol has a nominal functionality of from 2 to 6.

13. An encapsulated particle as set forth in claim 1 wherein said polyol has an OH number of from 350-500.

14. An encapsulated particle as set forth in claim 1 wherein said polyol is derived from a dipropylene glycol initiator in addition to said aromatic amine-based initiator.

15. An encapsulated particle as set forth in claim 1 wherein said polyurethane layer comprises a pigment for coloring said polyurethane layer.

16. An encapsulated particle as set forth in claim 1 wherein said core particle comprises a fertilizer selected from the group of nitrogen, phosphate, potash, sulfur, and combinations thereof.

17. An encapsulated particle comprising:
A a core particle;
B a polyurethane layer disposed about said core particle and comprising the reaction product of;
(i) an isocyanate component that comprises methylene diphenyl diisocyanate, and
(ii) a polyol derived from a toluene diamine.

18. An encapsulated particle as set forth in claim 17 wherein said toluene diamine is of the formula:

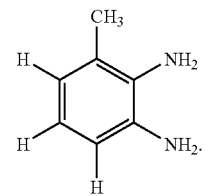

19. An encapsulated particle as set forth in claim 17 wherein said isocyanate component has a viscosity of from 20 to 700 centipoise at 25° C.

20. An encapsulated particle as set forth in claim 17 wherein said isocyanate component has a nominal functionality of from 1.5 to 4.

21. An encapsulated particle as set forth in claim 17 wherein said isocyanate component has an NCO content of from 25-40%.

22. An encapsulated particle as set forth in claim 17 wherein said polyol has a viscosity of from 5,000 to 17,000 centipoise at 25° C.

23. An encapsulated particle as set forth in claim 17 wherein said polyol has a nominal functionality of from 2 to 6.

24. An encapsulated particle as set forth in claim 17 wherein said polyol has an OH number of from 350-500.

25. An encapsulated particle as set forth in claim 17 wherein said polyol is derived from a dipropylene glycol initiator in addition to said toluene diamine.

26. An encapsulated particle as set forth in claim 17 wherein said polyurethane layer comprises a pigment for coloring said polyurethane layer.

27. An encapsulated particle as set forth in claim 17 wherein said core particle comprises a fertilizer selected from the group of nitrogen, phosphate, potash, sulfur, and combinations thereof.

* * * * *